May 21, 1957  O. R. ALBERT  2,793,262
STEERING WHEEL MOUNTED TURN SIGNAL CONTROL SWITCH
Filed June 24, 1955  3 Sheets-Sheet 1
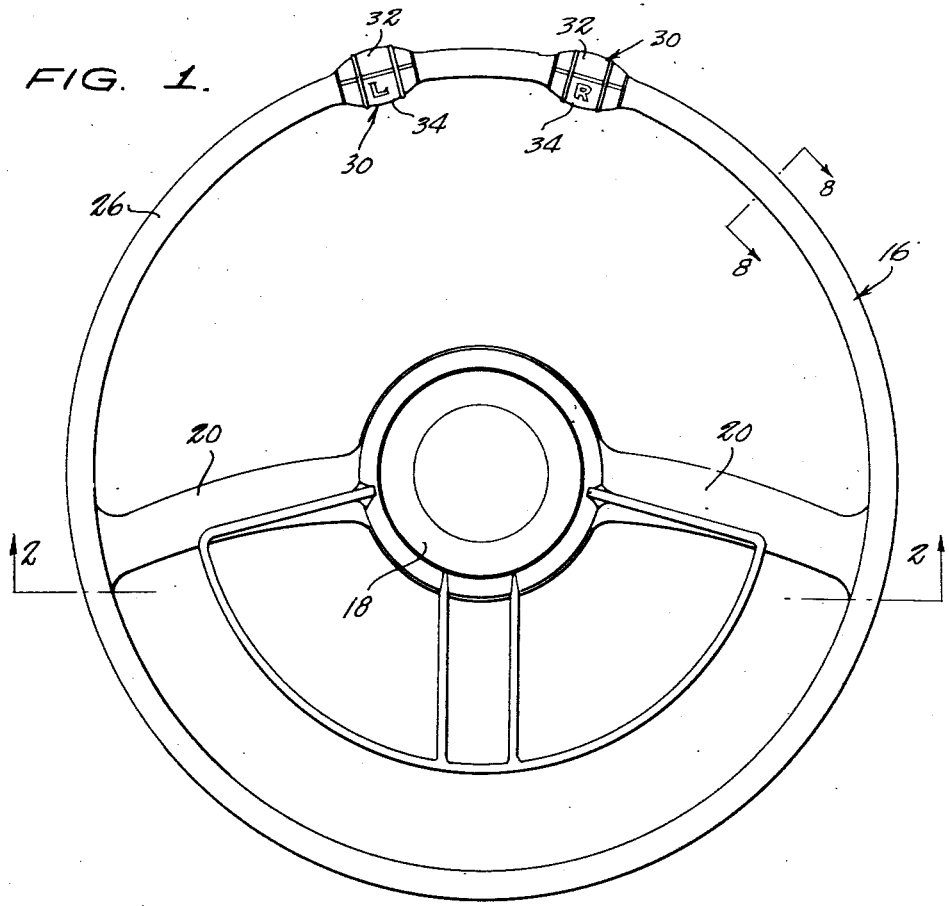
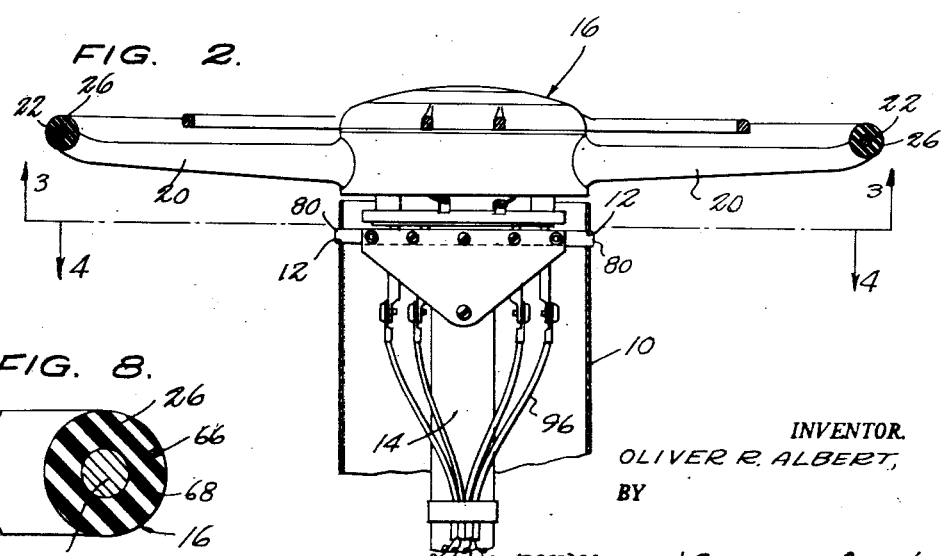
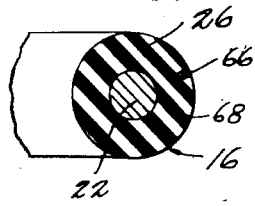
INVENTOR.
OLIVER R. ALBERT,
BY
McMorrow, Berman & Davidson
ATTORNEYS.

May 21, 1957 O. R. ALBERT 2,793,262
STEERING WHEEL MOUNTED TURN SIGNAL CONTROL SWITCH
Filed June 24, 1955 3 Sheets-Sheet 2
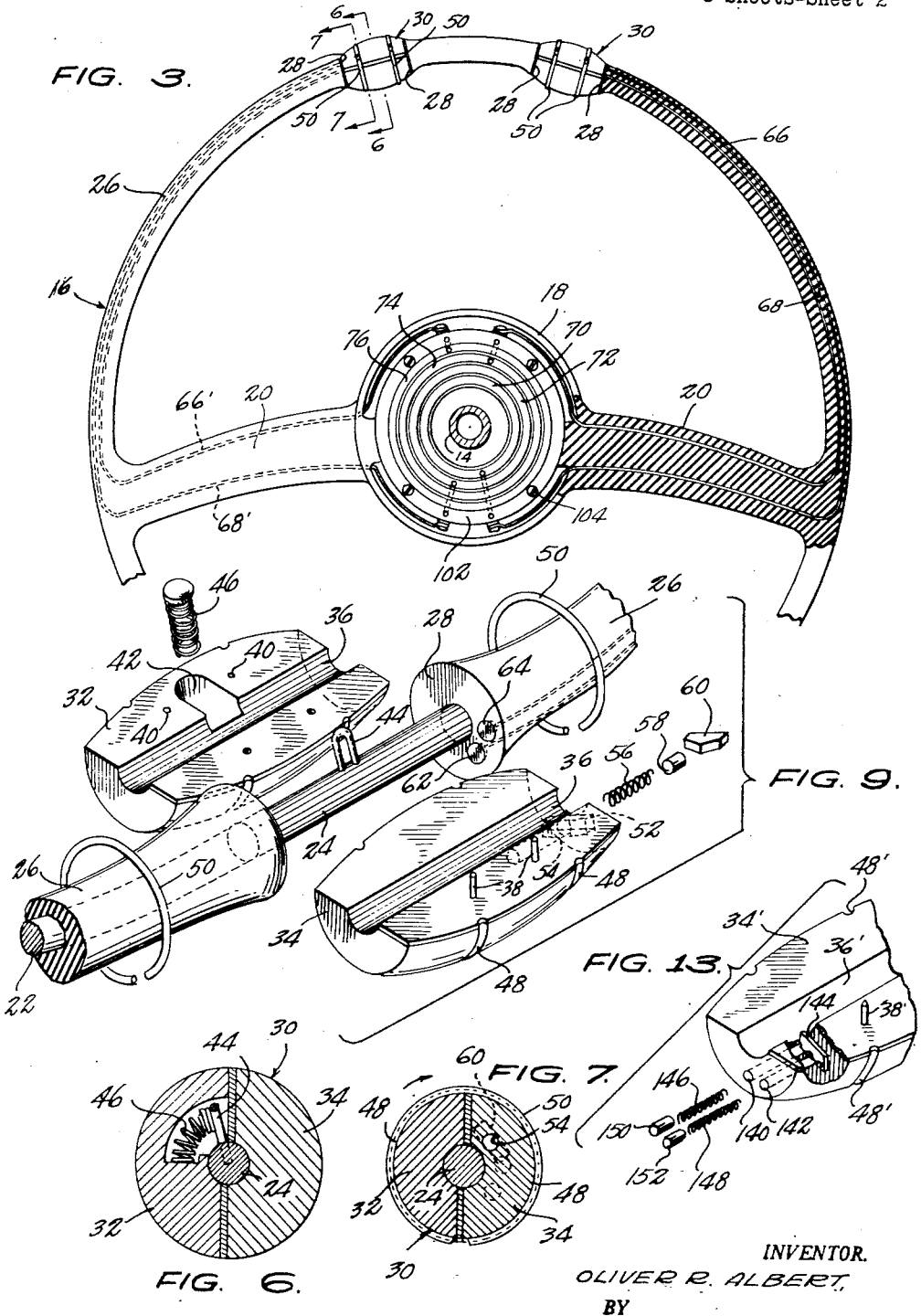
INVENTOR.
OLIVER R. ALBERT,
BY
McMorrow, Berman + Davidson
ATTORNEYS.

May 21, 1957  O. R. ALBERT  2,793,262
STEERING WHEEL MOUNTED TURN SIGNAL CONTROL SWITCH
Filed June 24, 1955  3 Sheets-Sheet 3
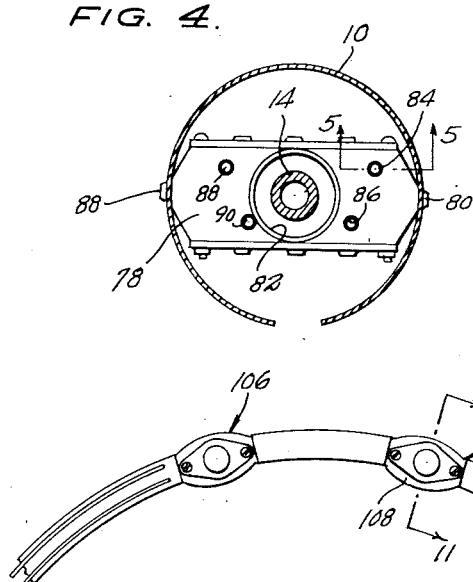
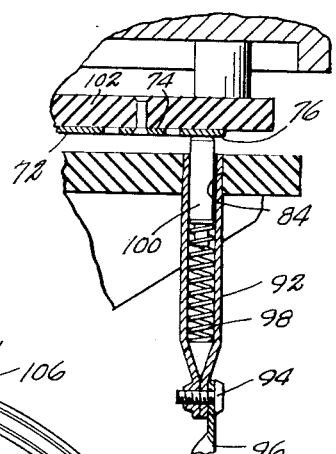
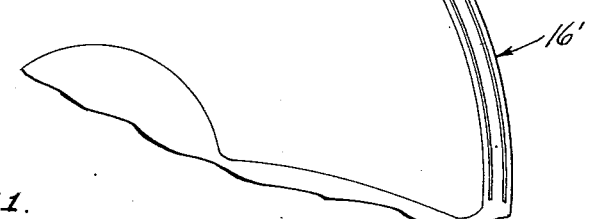
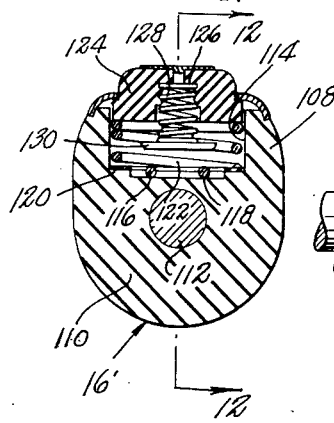
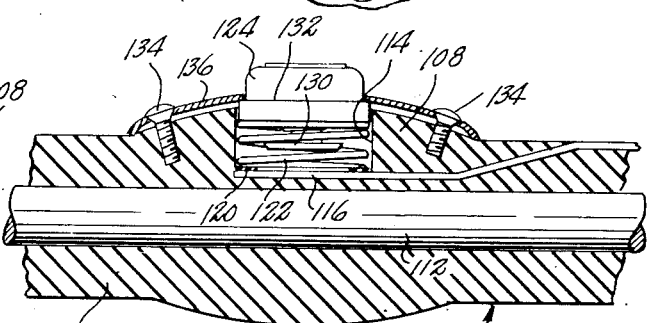
INVENTOR.
OLIVER R. ALBERT,
BY
McMorrow, Berman & Davidson
ATTORNEYS.

United States Patent Office 2,793,262
Patented May 21, 1957

2,793,262
STEERING WHEEL MOUNTED TURN SIGNAL CONTROL SWITCH

Oliver R. Albert, Gonzales, Tex.

Application June 24, 1955, Serial No. 517,735

7 Claims. (Cl. 200—61.57)

This invention relates to improvements in steering wheel mounted turn signal switch structures, and the primary object of the invention is to provide more practical and reliable devices of this kind which are of simple construction, and can be made in rugged and serviceable forms at relatively low cost.

Other objects and advantageous features of the invention will be apparent from the following description and the accompanying drawings, wherein, for purposes of illustration only, specific forms of the invention are set forth in detail.

In the drawings:

Figure 1 is a plan view of a steering wheel mounted switch structure according to the present invention;

Figure 2 is a transverse vertical sectional view taken substantially on the line 2—2 of Figure 1;

Figure 3 is a fragmentary horizontal sectional view taken substantially on the line 3—3 of Figure 2, and showing a portion of the steering wheel in horizontal section;

Figure 4 is a horizontal sectional view taken substantially on the line 4—4 of Figure 2;

Figure 5 is a fragmentary enlarged sectional view taken substantially on the line 5—5 of Figure 4;

Figure 6 is a fragmentary enlarged transverse vertical sectional view taken substantially on the line 6—6 of Figure 3;

Figure 7 is a view similar to Figure 6, taken substantially on the line 7—7 of Figure 3;

Figure 8 is an enlarged fragmentary sectional view taken substantially on the line 8—8 of Figure 1;

Figure 9 is an enlarged exploded perspective view of the form of switch shown in Figures 1 and 3;

Figure 10 is a fragmentary top plan view of another switch structure in accordance with the present invention;

Figure 11 is an enlarged transverse vertical sectional view taken substantially on the line 11—11 of Figure 10;

Figure 12 is an enlarged fragmentary sectional view taken substantially on the line 12—12 of Figure 11; and Figure 13 is a fragmentary perspective view showing a modified form of bridging contact.

Referring to the drawings in detail, a conventional steering column 10 is shown, provided adjacent its upper end with diametrically opposed openings 12. Extending through the steering column 10 for rotation about its own axis is a steering post 14 having on its upper end above the steering column 10 a steering wheel designated generally 16. The steering wheel 16 has a hub 18 from which spokes 20 extend which carry at their outer ends a rim 21 having a reinforcing core 22 which, with the exception of two circumferentially spaced portions 24, is concentric with the steering post 14. The core is surrounded by a body 26 of a non-conducting material which completes the rim 21. As illustrated in Figure 9, the rim body 26 terminates at opposite ends of the portions 24 and defines shoulders 28.

Switches 29 are rotatably mounted on the core portions 24 between the shoulders 28. Each switch 29 comprises a rotor 30 which comprises mating rotor halves 32 and 34 having longitudinal grooves 36 in their flat inner faces 33, which define journals for the rim portions 24, which then serve as spindles on which the rotors 30 are rotatable. The lower rotor half 34 is provided with dowel pins 38 which, when the halves are assembled, extend into dowel receiving openings 40 in the upper rotor half 32 is a radial recess 42 which opens at one end into the longitudinal groove 36, and into which extends a radially extending stop 44 fixed on the selected spindle 24. An expanding coiled spring 46 is confined in the recess 42 between the closed end of the recess 42 and the stop 44 whereby the rotor 30 is engaged in one direction. In the semicircular outer surfaces of the rotor halves 32 and 34 are longitudinally spaced circumferential grooves 48 which receive spring rings 50 which hold the rotor halves 32 and 34 together in embracing relation to the spindle 24. In one end of the rotor half 34 is a recess 52 which communicates at its inner end with a bore 54 which lies parallel to the groove 36, and extending into the bore 54 is an expanding coiled spring 56 which is compressed between the inner end of the bore 54 and a follower 58 engaged in the outer end of the bore 54. A conductive block 60 is seated in the recess 52 and is urged outwardly by the follower 58, under the influence of the spring 56 into sliding engagement with the adjacent shoulder 28. Circumferentially spaced contacts 62 and 64 on the adjacent shoulder 28 are located to be bridged by the block 60 when the rotor 30 is turned on its spindle 24 in a direction opposed by the spring 46.

Conductors 66 and 68 are severally connected to the contacts 62 and 64 and extend through passages in the rim body 26 and in a spoke 20 to the hub 18 of the steering wheel. Similar conductors 66' are connected to contacts similar to the contacts 62 and 64 on the opposite side of the steering wheel and lead to the hub 18.

Carried by the hub 18 of the steering wheel on the underside thereof in concentric spaced relation to the steering post 14 are concentrically spaced collector rings 70, 72, 74 and 76, to which conductors 66, 68, 66' and 68' are severally connected.

A transversely elongated horizontal plate 78 is provided on its opposite ends with longitudinally outwardly extending lugs 80 which extend through the steering column holes 12 and support the plate 78 in the steering column 10. As shown in Figure 4, the plate 78 is provided midway between its opposite ends with an opening 82 to accommodate the steering post 14 which extends through the plate 78 centrally of the collector rings 76, 74, 72 and 70. As shown in Figure 5, the plate 78 has openings 84, 86, 88 and 90. Secured in each of the openings 84, 86, 88 and 90 is a sleeve 92 which has a closed lower end which is threaded and receives a binding screw 94 by means of which a conductor 96 is connected thereto. A coil spring 98 is compressed in each tube 92 between a brush 100 sliding in the upper end of the tube, and the lower end of the tube. The brush 100 engages a related one of the collector rings 72, 74, or 76 and connects the related conductor 96 thereto. The conductors 96 are connected in any conventional manner to turn signals (not shown) attached to the vehicle upon which the device is to be used. The collector rings 70, 72, 74 and 76 are supported on a suitable disk 102 of nonconducting material which disk is supported as by screws 104 on the hub 18 of the steering wheel.

In the form of the invention shown in Figures 10 through 12, in place of the switches 29, I provide spaced switches 106 on the rim of a steering wheel designated generally 16'. Each switch 106 comprises an enlargement 108 formed on the nonconducting composition 110 forming the hand grip which surrounds the core 112 of the steering wheel. In the top of each enlargement 108 is a recess 114, and extending across the bottom of the recess are spaced longitudinal conductors 116 and 118. A washer 120 of nonconducting material engages the bottom of the recess 114 and defines a seat for the lower end of an expanding coiled spring 122 upon the upper end of which is seated a push button 124 having an internally screw threaded socket 126 in its underside into which is threaded the upper end of an expanding coiled spring 128 which extends downwardly through the lower end of the bore 126 and carries on its lower end a bridging contact 130. When the push button 124 is pressed downwardly against the resistance of the spring 122 and 128, the bridging contact 130 engages the conductors 116 and 118 and establishes connection between the conductors 116 and 118. In order to arrest outward movement of the push button 124 under the influence of the spring 122, the push button is provided with an outwardly extending annular shoulder 132 which engages the underside of a plate 136 secured as by screws 134 to the enlargement 108, as illustrated in Figures 11 and 12, the plate 136 having therein an opening 133 passing the part of the button above the shoulder 132.

In the form of switch illustrated in Figure 13, the lower rotor half 34' is provided with a longitudinal groove 36' which corresponds to the groove 36 in the rotor half 34. Dowel pins 38' extend outwardly from the flat inner side of the rotor half 34' for engagement in openings 40 in the upper rotor half 32, and grooves 48' are provided in the convex outer side of the rotor half 34' for receiving the spring rings 50 which hold the rotor halves assembled. Entering one end of the rotor half 34' are spaced parallel longitudinal bores 140 and 142 and extending across the inner ends of said bores 140 and 142 is a bridging conductor 144. Expanding coiled springs 146 and 148 are compressed in the respective bores 140 and 142 between the bridging contact 144 and contact brushes 150 and 152 engaged in the open ends of the bores 140 and 142 and arranged to engage with the shoulder contacts 62 and 64, so as to bridge the contacts 62 and 64.

It will be evident that with regard to the structures of Figures 1 and 13, when the operator of the vehicle wishes to make a right turn, the rotor 30 bearing the index R is rotated against the resistance of the spring 46 to bring the bridging block 60 into engagement with the contacts 62 and 64 and establish an electrical circuit between said conductors 66 and 68, collector rings 74 and 76, and the selected brushes, so as to illuminate the right hand turn signal (not shown). The turn signal will remain illuminated as long as the rotor 30 bearing the index R is held by the operator in the operated position. As soon as the turn is completed, and the rotor is released and returns to its initial position under the influence of the spring 46 the bridging block 60 is moved out of engagement with the contacts 62 and 64. Obviously, by similarly rotating the rotor 30 bearing the index L, a circuit will be closed through the opposite or left hand turn signal and will remain closed so long as the rotor 30 is held in the operated position. The turn signal switches can be operated without requiring removal of the hand of the vehicle operator from the steering wheel rim.

With regard to the switch structure of Figures 10 to 12, it is obvious that upon depressing either the right hand or left hand push button 124, an electrical circuit will be established between the conductors 116 and 118 by reason of the engagement of the bridging contact 130 therewith. Obviously, with the conductors 116 and 118 connected through the steering wheel and steering column, as above described, with the turn signals, the operation of the turn signals may be readily governed by the user and without removing his hands from the steering wheel rim.

While in the foregoing there have been shown and described the preferred embodiments of this invention, it is to be understood that minor changes in the details of construction, combination and arrangement of parts may be resorted to without departing from the spirit and scope of the invention as claimed.

What is claimed is:

1. In combination, a steering wheel having a rim comprising a core and a rim body surrounding the core, said rim body being discontinuous with respect to a portion of the core and defining shoulders at opposite ends of said portion, said core portion serving as a spindle, a switch comprising a rotor journaled on said spindle, spring means acting between said spindle and said rotor and serving to rotate said rotor from an operated position to a starting position, a bridging member on one end of said rotor, and circumferentially spaced contacts on the shoulder adjacent said one end of the rotor arranged to be bridged by said bridging member only in the operated position of the rotor.

2. In combination, a steering wheel having a rim comprising a core and a rim body surrounding the core, said rim body being discontinuous with respect to a portion of the core and defining shoulders at opposite ends of said portion, said core portion serving as a spindle, a switch comprising a rotor journaled on said spindle, spring means acting between said spindle and said rotor and serving to rotate said rotor from an operated position to a starting position, a bridging member on one end of said rotor, and circumferentially spaced contacts on the shoulder adjacent said one end of the rotor arranged to be bridged by said bridging member only in the operated position of the rotor, said rotor comprising upper and lower separable rotor halves having flat facing inner sides and convex outer sides, the inner faces of the halves having longitudinal grooves defining a journal receiving said spindle, and means embracing the rotor halves and securing them together around the spindle.

3. In combination, a steering wheel having a rim comprising a core and a rim body surrounding the core, said rim body being discontinuous with respect to a portion of the core and defining shoulders at opposite ends of said portion, said core portion serving as a spindle, a switch comprising a rotor journaled on said spindle, spring means acting between said spindle and said rotor and serving to rotate said rotor from an operated position to a starting position, a bridging member on one end of said rotor, and circumferentially spaced contacts on the shoulder adjacent said one end of the rotor arranged to be bridged by said bridging member only in the operated position of the rotor, said rotor comprising upper and lower separable rotor halves having flat facing inner sides and convex outer sides, the inner faces of the halves having longitudinal grooves defining a journal receiving said spindle, and means embracing the rotor halves and securing them together around the spindle, said bridging member being carried by one of said rotor halves.

4. In combination, a steering wheel having a rim comprising a core and a rim body surrounding the core, said rim body being discontinuous with respect to a portion of the core and defining shoulders at opposite ends of said portion, said core portion serving as a spindle, a switch comprising a rotor journaled on said spindle, spring means acting between said spindle and said rotor and serving to rotate said rotor from an operated position to a starting position, a bridging member on one end of said rotor, and circumferentially spaced contacts on the shoulder adjacent said one of the rotor arranged to be bridged by said bridging member only in the operated position of the rotor, said rotor comprising upper and lower separable rotor halves having flat facing inner sides and convex outer sides, the inner faces of the halves having longitudinal grooves defining a journal receiving said spindle, and means embracing the rotor halves and securing them together around the spindle, said bridging member being carried by one of said rotor halves, and comprising spring pressed contact means.

5. In combination, a steering wheel having a rim comprising a core and a rim body surrounding the core, said rim body being discontinuous with respect to a portion of the core and defining shoulders at opposite ends of said portion, said core portion serving as a spindle, a switch comprising a rotor journaled on said spindle, spring means acting between said spindle and said rotor and serving to rotate said rotor from an operated position to a starting position, a bridging member on one end of said rotor, and circumferentially spaced contacts on the shoulder adjacent said one end of the rotor arranged to be bridged by said bridging member only in the operated position of the rotor, said rotor comprising upper and lower separable rotor halves having flat facing inner sides and convex outer sides, the inner faces of the halves having longitudinal grooves defining a journal receiving said spindle, and means embracing the rotor halves and securing them together around the spindle, said bridging member being carried by one of said rotor halves, and comprising spring pressed contact means, the said one end of said one rotor half having bore means, expanding spring means in said bore means urging said contact means toward said adjacent shoulder.

6. The combination of claim 5 wherein said bore means consists of a single bore and said spring means consists of a single expansion spring and a follower engaged in the single bore, and said contact means consists of a single bridging block with which the follower is engaged.

7. The combination of claim 5 wherein said bore means consists of a pair of bores and said spring means consists of a spring confined in each bore, and separate bridging contacts in the bores and engaged with the springs.

References Cited in the file of this patent

UNITED STATES PATENTS

| | | |
|---|---|---|
| 1,500,191 | Herbert | July 8, 1924 |
| 1,683,988 | Reading | Sept. 11, 1928 |
| 1,726,428 | Eaton | Aug. 27, 1929 |
| 2,173,265 | Richards | Sept. 19, 1939 |
| 2,291,159 | Jacobi | July 28, 1942 |
| 2,657,286 | Hoklas | Oct. 27, 1953 |

FOREIGN PATENTS

| | | |
|---|---|---|
| 4,649 | Australia | Nov. 11, 1926 |